United States Patent [19]
Seeley et al.

[11] Patent Number: 6,132,223
[45] Date of Patent: Oct. 17, 2000

[54] PC ADAPTOR CARD FOR IC STICK

[75] Inventors: Gregory Alan Seeley, Orange; Jay Brian Betker, Yorba Linda, both of Calif.

[73] Assignee: ITT Manufacturing Enterprises, Inc., Wilmington, Del.

[21] Appl. No.: 09/370,229

[22] Filed: Aug. 9, 1999

[51] Int. Cl.[7] .................................................. H01R 12/00
[52] U.S. Cl. .................... 439/76.1; 439/945; 439/377; 439/630
[58] Field of Search ........................... 439/76.1, 946, 439/945, 64, 377, 630

[56] References Cited

U.S. PATENT DOCUMENTS

| | | | |
|---|---|---|---|
| 3,853,379 | 12/1974 | Goodman et al. | 339/91 |
| 5,400,216 | 3/1995 | Tsai | 361/684 |
| 5,413,490 | 5/1995 | Tan et al. | 439/76 |
| 5,457,601 | 10/1995 | Georgopulos et al. | 361/686 |
| 5,472,351 | 12/1995 | Greco et al. | 439/353 |
| 5,473,505 | 12/1995 | Kessoku et al. | 361/684 |
| 5,499,462 | 3/1996 | Bartuska et al. | 361/737 |
| 5,574,625 | 11/1996 | Ohgami et al. | 361/684 |
| 5,625,534 | 4/1997 | Okaya et al. | 361/686 |
| 5,673,180 | 9/1997 | Pernet | 361/756 |
| 5,679,007 | 10/1997 | Potdevin et al. | 439/76.1 |
| 5,716,221 | 2/1998 | Kantner | 439/64 |
| 5,752,857 | 5/1998 | Knights | 439/638 |
| 5,773,332 | 6/1998 | Glad | 439/344 |
| 5,822,190 | 10/1998 | Iwasaki | 361/737 |
| 5,846,092 | 12/1998 | Feldman et al. | 439/76.1 |

*Primary Examiner*—Gary F. Paumen
*Assistant Examiner*—Truc Nguyen
*Attorney, Agent, or Firm*—Thomas L. Peterson

[57] ABSTRACT

A PCMCIA standard PC card is provided, that can receive an IC stick type of card and connect contact pads on the IC stick to contacts at the front connector of the PC card. The PC card has a guide (90) with a rear cap portion (92) that occupies the space (84) between the rear ends of the top and bottom sheet metal covers (72, 74). The rear cap portion has slot side walls (102, 104) that closely guide the IC stick in movement forwardly into the slot of the PC card, until pads (60) on the IC stick engage contacts (56) on an IC stick connector (54) that is mounted on a circuit board (40) within the PC card. The circuit board has a rear end with tabs (144, 146) supported by the rear cap portion of the guide.

10 Claims, 4 Drawing Sheets

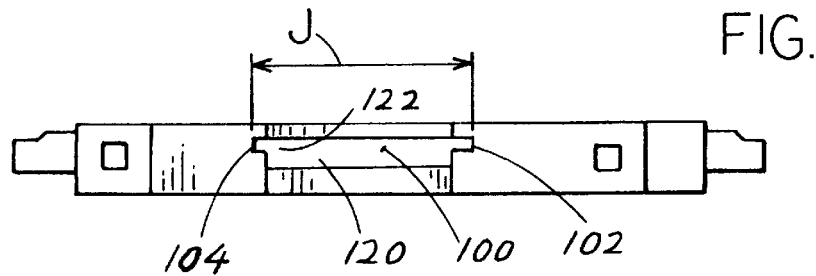
FIG. 5
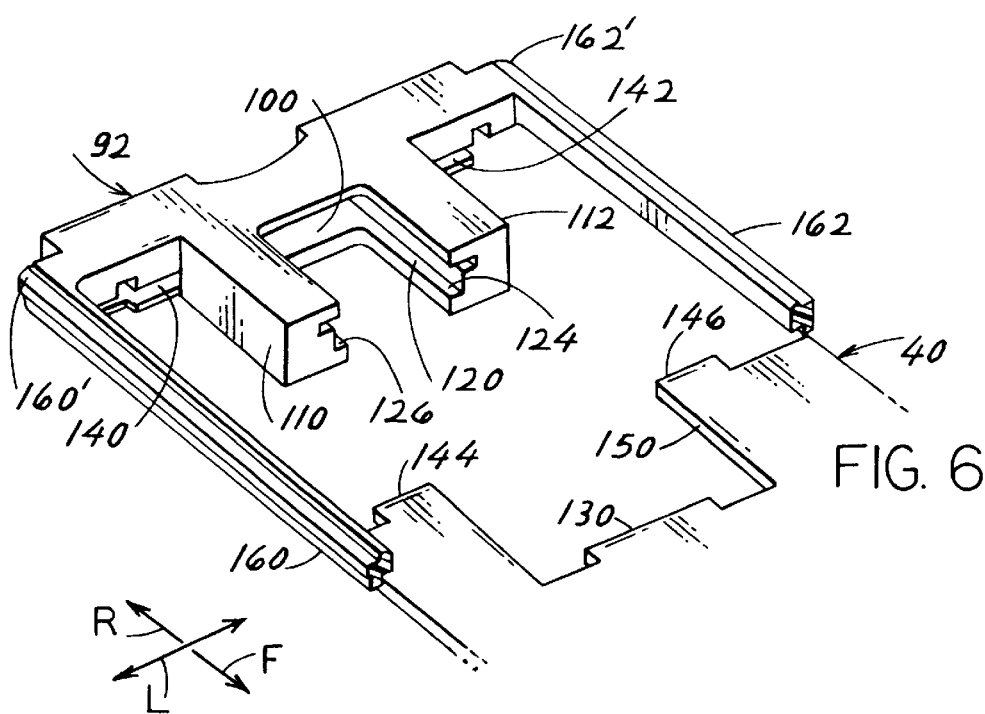
FIG. 6
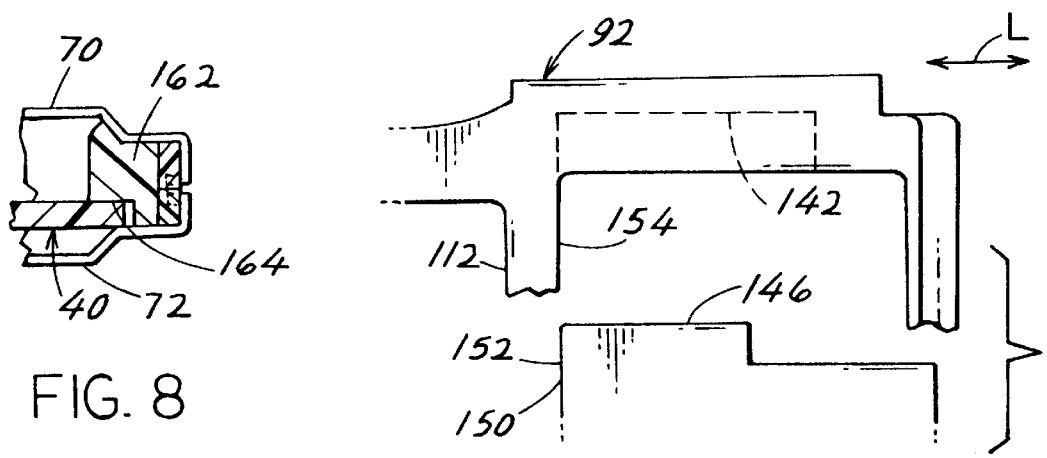
FIG. 7
FIG. 8

PC ADAPTOR CARD FOR IC STICK

BACKGROUND OF THE INVENTION

The term "IC Stick" herein refers to cards that are thin (almost always less than 3 mm thick) and wide (a width that is a plurality of times its thickness), that have at least one integrated circuit that is usually for memory storage but sometimes for data processing, and that have contact pads on one of their faces. One type of IC stick is the Media Stick that is commonly used to record images in digital cameras, while another type is the MicroSim card which is a miniature smart card for activating auto radios. Many electronic devices such as notebook computers have passages for receiving PC cards constructed in accordance with PCMCIA (Personal Computer Memory Card International Association ) standards. In most cases the standards specify a PC card width of 54 mm and a 68-position front connector. It would be desirable if a PC card could be used as an adaptor to receive a IC stick and to engage contact pads of the IC stick, and connect the contact pads to selected contacts of the 68 -position connector at the front of the PC card, either directly or through processing circuitry (e.g. filters, etc.).

SUMMARY OF THE INVENTION

In accordance with one embodiment of the present invention, a PC adaptor card is provided for receiving an IC stick and coupling its contact pads to an electronic device that receives the PC card, where the PC adaptor card is of simple and rugged construction. The PC adaptor card includes a guide with a rear cap portion that occupies the space between the rear ends of top and bottom sheet metal cover parts. The rear cap portion includes a horizontally-extending slot with opposite side walls that closely guide the IC stick in movement forwardly into the PC card. An IC stick connector is mounted on a circuit board within the card, and the slot side walls are precisely aligned with the IC stick connector to assure that the fully inserted IC stick properly engages contacts of the IC stick connector.

The circuit board rear end is supported by the rear cap portion to maintain alignment between them. The rear of the circuit board has a plurality of tabs that are received in slits of the rear cap portion to help align them. The slot in the rear cap portion, whose opposite side walls closely guide the IC stick, includes a downward extension for receiving a memory chip on the IC stick.

The novel features of the invention are set forth with particularity in the appended claims. The invention will be best understood from the following description when read in conjunction with the accompanying drawings.

BRIEF DESCRIPTION OF THE DRAWINGS

FIG. 5 is a rear elevation view of the guide of FIG. 3.

FIG. 6 is an exploded top and rear isometric view of the guide and circuit board of FIG. 3.

FIG. 7 is an exploded plan view of a portion of the guide and the circuit board of FIG. 6.

FIG. 8 is a sectional view taken on line 8—8 of FIG. 1.

DESCRIPTION OF THE PREFERRED EMBODIMENTS

Figure 1:
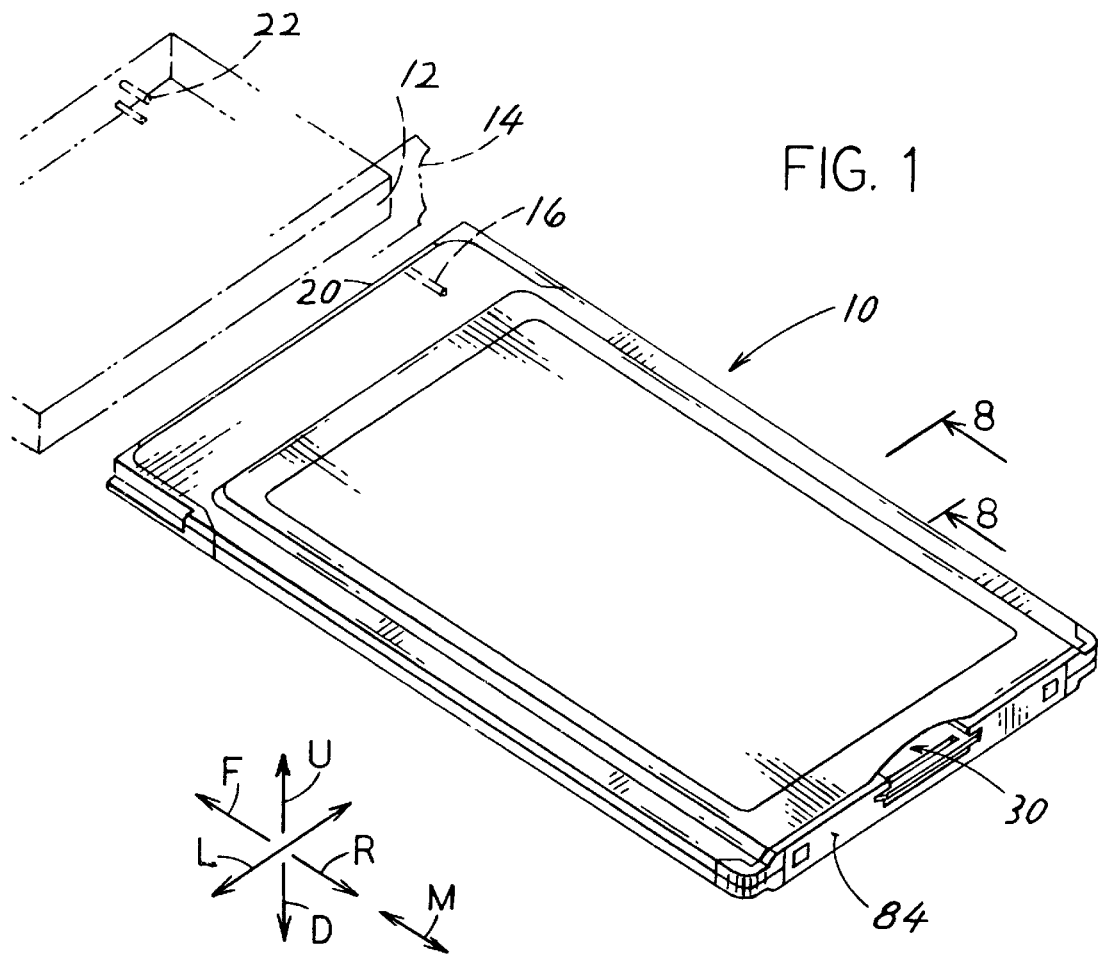
FIG. 1 is a rear and top isometric view of a PC adaptor card of the present invention, showing an IC stick fully inserted into the PC adaptor card.
Figure 2:
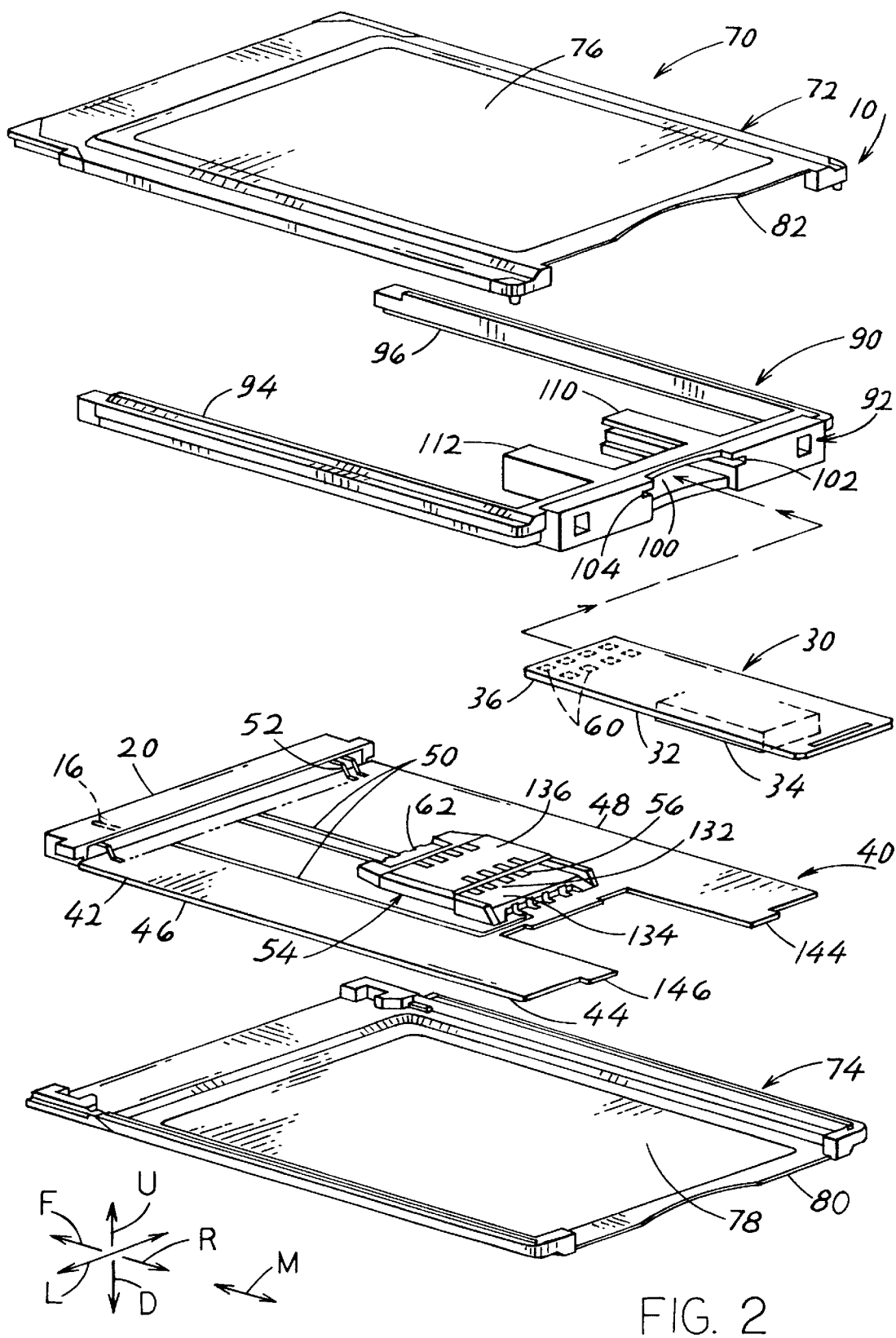
FIG. 2 is an exploded rear and top isometric view of the PC adaptor card of FIG. 1, and also showing the IC stick

FIG. 1 illustrates a data adaptor card, or PC adaptor card 10 which is constructed in accordance with PCMCIA standards (or CF standards for a Compact Flash card). This allows the PC adaptor card to be inserted into a passage 12 of an electronic device 14 until contacts 16 of a front connector 20 of the PC adaptor card engage corresponding contacts 22 at the front end of the electronic device passage. The PC adaptor card is designed to receive a IC stick 30. The IC stick 30 has a smaller width, length, and thickness than the PC adaptor card, and is used to store images from digital cameras (for a media stick), to store data identifying the user (for a MicroSim card), etc. The particular type of IC stick shown in FIG. 2 is a media stick (sometimes called a memory-media card), that includes a wide and thin upper part 32 and may include a narrower memory chip 34. The stick upper part has narrow (e.g. 0.75 mm) laterally opposite edges 36

FIG. 2 shows details of the PC adaptor card 10 and of the IC stick 30. The card 10 includes a circuit board 40 with front and rear ends 42, 44 and opposite sides 46, 48. A plurality of conductive traces 50 are formed on the circuit board. The traces extend to tails 52 of selected front contacts 16, and also extend to an IC stick connector 54 that is mounted on the circuit board. The IC stick connector 54 has two rows of pad-engaging contacts 56 which are designed to engage contact pads 60 on the lower face of the IC stick 30. Each of the pad-engaging contacts 56 has a terminal 62 that is soldered to one of the circuit board traces 50.

The PC adaptor card includes a cover 70 with top and bottom cover halves 72, 74. Each cover half includes a sheet metal cover part 76, 78 that covers the circuit board 40. The sheet metal cover parts have rear ends 80, 82 that are vertically spaced to form a space 84 (FIG. 1) of 4.6 mm between them.

The PC adaptor card includes a guide 90 that comprises a rear cap portion 92 and a pair of legs 94, 96 that extend forwardly from laterally L opposite sides of the rear cap portion. The guide 90 is a single integrally molded part, with the rear cap portion forming a slot 100 that closely guides the IC stick 30 in sliding in forward F and rearward R directions, which may be referred to as longitudinal directions M. The rear cap portion forms slot side walls 102, 104 that closely guide the IC stick in movement into and out of the PC adaptor card.

Figure 3:
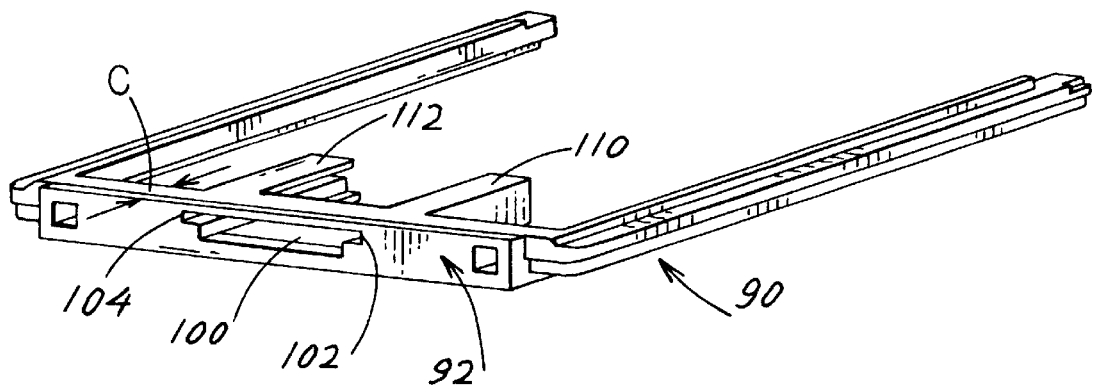
FIG. 3 is a top and rear isometric view of only the guide of the PC adaptor card of FIG. 2.

FIG. 3 shows that the rear cap portion 92 has a pair of guide bars 110, 112 that extend forwardly along opposite sides of the slot 100. This provides each of the opposite side walls 102, 104 of the slot with a considerable length to assure alignment of the inserted IC stick with the IC stick connector. The length of the slot side walls 102, 104 is preferably at least as great and preferably greater than the width of the slot 100, to provide good alignment.

FIG. 5 shows that the slot has a downward extension 120 that extends under the slot portion 122 normally occupied by the upper part of the IC stick. The downward slot extension 120 has a smaller lateral width than the slot portion 122 and is used to pass a memory chip 34 (FIG. 2) on the IC stick. FIG. 6 shows that the downward slot extension 120 results in a pair of shelves 124, 126. The circuit board can be provided with a middle tab 130 that can fit into the downward slot extension 120 and rest on the shelves 124, 126. It is noted that the IC stick connector 54 (FIG. 2) preferably has a connector slot 132 formed between a bottom wall 134 (the stick-engaging contacts 56 project through and above the wall 134 and a top hold down wall 136, so the connector 54 and circuit board do not tend to move up or down when the IC stick is inserted.

FIG. 6 shows that the rear cap portion 92 has a pair of forwardly-opening slits 140, 142. The circuit board has a pair of tabs 144, 146 that are inserted into the slits 140, 142, to allow the rear cap portion to support the front end of the circuit board. The slits each have a thickness that is about the same as the thickness of the circuit board tabs to vertically position the circuit board. This vertically positions the slot guide walls 102, 104 with respect to the IC stick connector 54. The circuit board has a center slot 150 that receives the guide bars 110, 112 to allow the tabs to reach into the slits. FIG. 7 shows that opposite sides 152 of the circuit board slot lie close to opposite sides 154 of the bars such as 112. This results in the guide closely controlling the lateral L position of the circuit board rear end, as well as supporting the circuit board rear end through the tabs.

While applicant has used terms such as "top" and "bottom" to describe the invention as it is illustrated, the PC adaptor card can be used in any orientation.

Figure 4A:
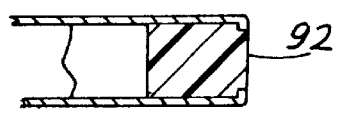
FIG. 4A is a view taken on line 4A—4A of FIG. 4.
Figure 4:
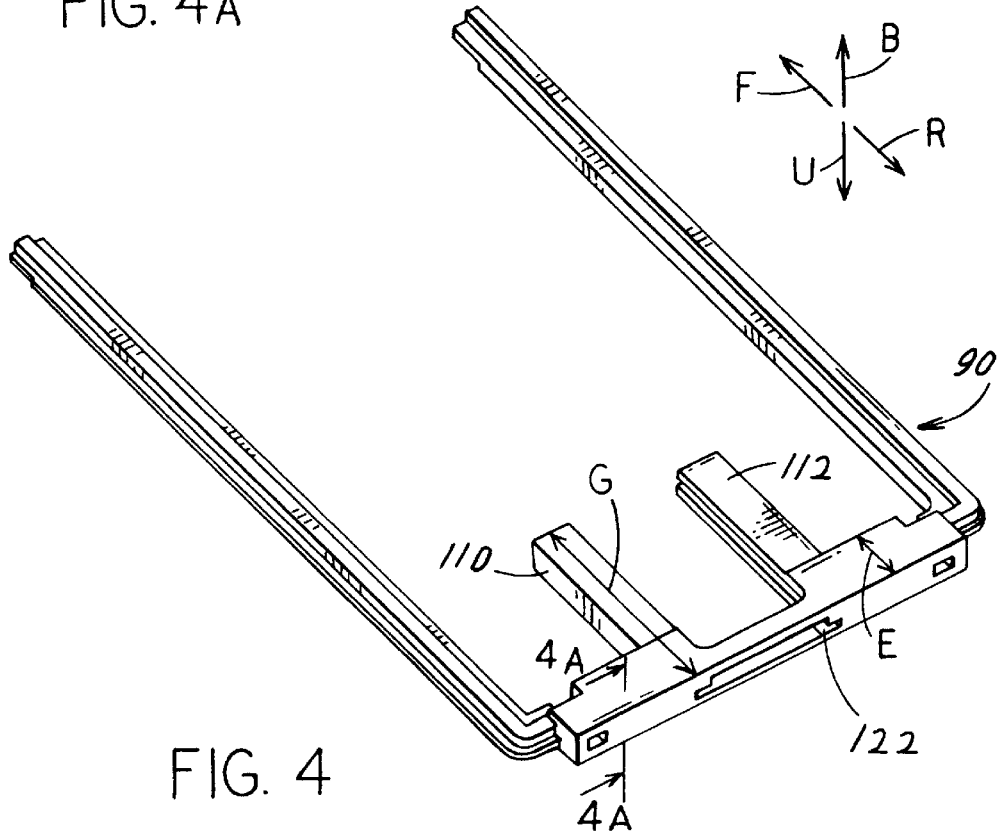
FIG. 4 is an upside-down view of the guide of FIG. 3.

Applicant has constructed a PC adaptor card of the illustrated construction, with the guide rear cap portion having a longitudinal length E (FIG. 4) of 5.8 mm on laterally opposite sides of the bars 110, 112, and with each bar having a length G of 21.2 mm. The thin slot part 122 had a width J (FIG. 5) of 15.75 mm and a thickness of 0.83 mm (to receive an IC stick part of 0.75 mm thickness).

The rear cap portion 92 has laterally opposite sides 160', 162' (FIG. 6), and the guide 90 includes a pair of elongated legs 160, 162 that extends forwardly from the opposite sides of the rear cap portion. As shown in FIG. 8, each leg such as 162 has a shelf 164 that engages the circuit board 40 and each leg engages the top and bottom cover halves 70, 72.

Thus, the invention provides a PC adaptor card for connection to contact pads of an IC stick, where the PC adaptor card is of relatively simple and rugged construction. A guide formed of a single integral piece of molded plastic, includes a rear cap portion that lies in the space between the rear ends of the top and bottom sheet metal cover parts and which forms a slot with slot side walls that closely slidably guide an IC stick into the PC adaptor card. An IC stick connector is mounted on a circuit board to lie closely behind the slot. The rear end of the circuit board is directly connected to the rear cap portion to accurately position the circuit board rear end, and therefore also the IC stick connector, with respect to the slot side guide walls.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A PC adaptor card for connecting to contact pads of a IC stick, which includes a circuit board with front and rear ends and a plurality of conductive traces, a front connector lying at said PC card front end and having front contacts connected to said traces, and a cover with top and bottom cover halves that each includes a sheet metal cover part that covers said circuit board, with said sheet metal cover parts having vertically spaced rear ends forming a space between them, comprising:

an IC stick connector mounted on said circuit board and having pad-engageable contacts connected to said traces;

a guide that includes a rear cap portion that occupies said space between said sheet metal part rear ends, said rear cap portion including a horizontally-extending slot with at least laterally opposite guide slot side walls that closely guide said IC stick in movement forwardly into said PC adaptor card, with said IC stick connector being aligned with said slot so contact pads on the IC stick engage the pad-engageable contacts.

2. The PC adaptor card described in claim 1 wherein:

said circuit board rear end is supported by said rear cap portion to maintain precise alignment of said IC stick connector with said guide slot walls.

3. The PC adaptor card described in claim 2 wherein:

said guide rear end cap portion has a plurality of forwardly opening slits, and said circuit board rear end has a plurality of rearwardly-extending tabs that each fits into a corresponding one of said slits, with said slits each having a vertical height about the same as the thickness of said circuit board to closely vertically position the circuit board rear end.

4. The PC adaptor card described in claim 1 wherein:

said cap portion includes a downward slot extension of smaller lateral width than said slot and extending downwardly from a middle portion of said slot but not under said guide slot side walls.

5. The PC adaptor card described in claim 1 wherein;

said guide slot side walls form guide bars that extend forwardly beyond adjacent portions of said rear cap portion;

said circuit board rear end has a center slot forming a pair of laterally-spaced board rear extensions that have free ends and that lie on laterally opposite sides of said guide bars, with each board rear extension engaged with said guide rear cap portion.

6. The PC adaptor card described in claim 1 wherein:

said rear cap portion includes a rear wall part having an average longitudinal thickness of no more than one centimeter, with said rear wall part extending laterally across said space between said sheet metal cover parts, and a pair of guide bars forming said guide slot side walls and each having a longitudinal length of a more than one centimeter and extending rearwardly from said rear wall part.

7. The PC adaptor card described in claim 1 wherein:

said circuit board has laterally opposite sides;

said rear cap portion of said guide has laterally opposite sides, and said guide has a pair of elongated legs extending forwardly from said opposite sides, with said cover halves having laterally opposite sides that fix the lateral positions of said legs, and with said legs having shelves that support said laterally opposite sides of said circuit board.

8. A PC adaptor card for connecting to contact pads of a IC stick, comprising:

a circuit board which has longitudinally-spaced front and rear ends and laterally opposite sides, said circuit board having a plurality of electrically conductive traces thereon;

a front connector connected to said circuit board front end and having front contacts connected to said traces;

a cover which includes top and bottom cover halves with each cover half including a sheet metal part that covers said circuit board, with said cover halves fixed together around said circuit board, and with said cover halves having rear ends leaving a space between them;

an IC stick connector mounted on said circuit board, said IC stick connector having contacts engaged with said traces;

a guide that includes a rear cap portion lying in said space between said cover half rear ends, said rear cap portion having a longitudinally-extending slot with laterally opposite guide slot walls that closely guide said IC stick in sliding movement to said IC stick connector.

9. The PC adaptor card described in claim 8 wherein:

said rear cap portion has a rear face with a pair of laterally-extending slits therein that open in a forward direction, and said circuit board has a pair of laterally-spaced and rearwardly-projecting tabs that project into said slits.

10. The PC adaptor card described in claim 9 wherein:

said rear cap portion has a lateral middle with a forward extension thereat forming said opposite guide slot walls, and said circuit board has a center slot that receives said forward extension, with said slot forming a pair of rearward extensions on laterally opposite sides of said slot with said rearward extensions forming said tabs.

* * * * *